(12) United States Patent
Kapoor

(10) Patent No.: US 6,404,769 B1
(45) Date of Patent: Jun. 11, 2002

(54) DIRECTIONAL ROUTING OF PACKETS IN A SATELLITE NETWORK

(75) Inventor: Vijay Kapoor, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/080,179

(22) Filed: May 18, 1998

Related U.S. Application Data

(63) Continuation of application No. 08/669,777, filed on Jun. 26, 1996, now abandoned.

(51) Int. Cl.[7] .......................... H04L 12/56; H04B 7/185
(52) U.S. Cl. .................. 370/398; 370/252; 370/316; 370/325; 370/422; 342/353; 340/3.42
(58) Field of Search .............................. 370/230, 404, 370/408, 411, 406, 316, 409, 401, 412, 397, 428, 429, 398, 399, 393, 392, 355, 356, 465, 473, 474, 475, 325, 422, 503, 509, 512, 517, 386, 471, 217, 244, 251, 252, 253, 254; 340/3.43, 3.42, 7.27; 455/12, 33, 32, 13; 342/350, 354, 355, 356; 379/221.01, 221.06, 229, 230

(56) References Cited

U.S. PATENT DOCUMENTS

| 4,797,882 A | * | 1/1989 | Maxechuk |
| 5,008,952 A | * | 4/1991 | Davis et al. |
| 5,615,254 A | * | 3/1997 | Qiu et al. |

* cited by examiner

Primary Examiner—William Luther
(74) Attorney, Agent, or Firm—Ingrassia, Fisher & Loren; Frank J. Bogacz

(57) ABSTRACT

A method and apparatus encompasses a technique for routing an information packet through a satellite communications system 20 from a source satellite 38 to a destination satellite 40. A path through the system 20 is chosen for the packet and an identifier identifying the path is appended to the packet. In addition, an identifier identifying the destination satellite 40 is appended to the packet. Satellites in the system 20 then use the identifiers in the packet to route the packet to the destination satellite 40. If the chosen path is not available, an alternate path can be taken by the packet. In one embodiment of the present invention, a centralized controller 36 is provided for controlling the routing of packets throughout the entire system 20.

29 Claims, 3 Drawing Sheets

DIRECTIONAL ROUTING OF PACKETS IN A SATELLITE NETWORK

The present application is a continuation of prior U.S. application Ser. No. 08/669,777, filed on Jun. 26, 1996, now abandoned which is hereby incorporated by reference, and priority thereto for common subject matter is hereby claimed.

FIELD OF THE INVENTION

The invention relates generally to packet-based communications networks and, more particularly, to a system for controlling the routing of packets in a packet-based communications network that is especially apt for use in a satellite communications network.

BACKGROUND OF THE INVENTION

Satellite communications systems generally include a plurality of communications satellites that orbit a primary body (such as the earth) on substantially fixed paths. The plurality of communications satellites (known as a satellite constellation) forms a communications network having a node at each satellite location. Each satellite in the constellation generally has the ability to communicate with one or more ground stations on the earth's surface (via uplinks and downlinks) as well as with other satellites in the constellation (via crosslinks). Using these satellite capabilities, the satellite communications system can establish a channel of communication between users in geographically diverse places on earth. Global satellite communications systems are currently in development that will be capable of providing continuous communications coverage to most areas of the earth's surface.

To deliver information via a satellite communications system, the following procedure is generally followed. First, information is delivered from a first user to a satellite ground station via, for example, local telephone lines. The local ground station packetizes the information and transfers the information packets to a source satellite in the constellation via an established uplink to the satellite. The information packets are then transferred through the satellite network, via crosslinks, until a destination satellite is reached. The destination satellite then transmits the information packets, via an established downlink, to a second ground station that is proximate to the second user. The second ground station recombines the information packets and delivers the information to a second user via local telephone lines.

In general, a satellite communications system will be highly meshed, i.e., there will be many different routes between two nodes (i.e., satellites) in the network. Therefore, an important at consideration in a satellite communications system is the selection of a route through the network from the source satellite to the destination satellite. For example, it is desirable that a route through the network be chosen that minimizes traffic congestion in the network. Prior satellite routing systems generally perform a time consuming investigation of each of the available routes during a call setup period before assigning a route to a given connection. In addition to being relatively slow, these prior systems require a great amount of processing overhead during call setup. Further, due to limitations in the ability of such systems to account for network usage, the prior systems are not generally capable of performing optimal network resource management. That is, because the system must perform investigations prior to route assignment, and is not privy to a prior knowledge of network resource usage, optimal management of resources is generally unattainable. Also, in satellite systems using polar orbits, prior routing systems do not provide the degree of flexibility necessary to handle the satellite "hand-offs" that are periodically performed, Therefore, a need exists for a method of routing packets in a satellite communications system which is capable of rapidly choosing an optimal route through a satellite communications network during a call setup period. In addition, a need exists for a method of routing packets that requires relatively little processing to achieve a substantially optimal route. Further, a need exists for a method of efficiently, flexibly and optimally managing network resources in a satellite communications system.

DETAILED DESCRIPTION OF A PREFERRED EMBODIMENT

The present invention relates to a method for routing information packets between nodes in a communications network. The invention is capable of rapidly choosing an optimal route through the communications network for a given connection while efficiently managing network resources. In addition, the invention requires relatively little processing overhead to achieve its benefits. The invention reduces the number of possible routes through the network and assigns an identifier to each of the routes. The identifier is then used by the intermediate nodes in the network to transfer the packet to a destination node.

Because the method of the present invention is relatively uncomplicated, a single centralized controller can be used to make routing decisions for the entire network. Because the routing decisions are made in a single location, information relating to network usage is assembled and available for use from a single source. The controller makes the routing decisions based on the known information traffic levels in the network so that traffic congestion in the network can be effectively controlled and network resources, such as available bandwidths, can be efficiently managed.

Once an optimal route through the network is selected by the controller, the route is used for the duration of the call, ensuring that packets arrive at a destination node in sequence and within a prescribed delay. The method of the present invention also provides for the rerouting of packets should the optimal route become unavailable. The method is particularly apt for use in satellite communications networks, especially those which are highly meshed.

Figure 1:
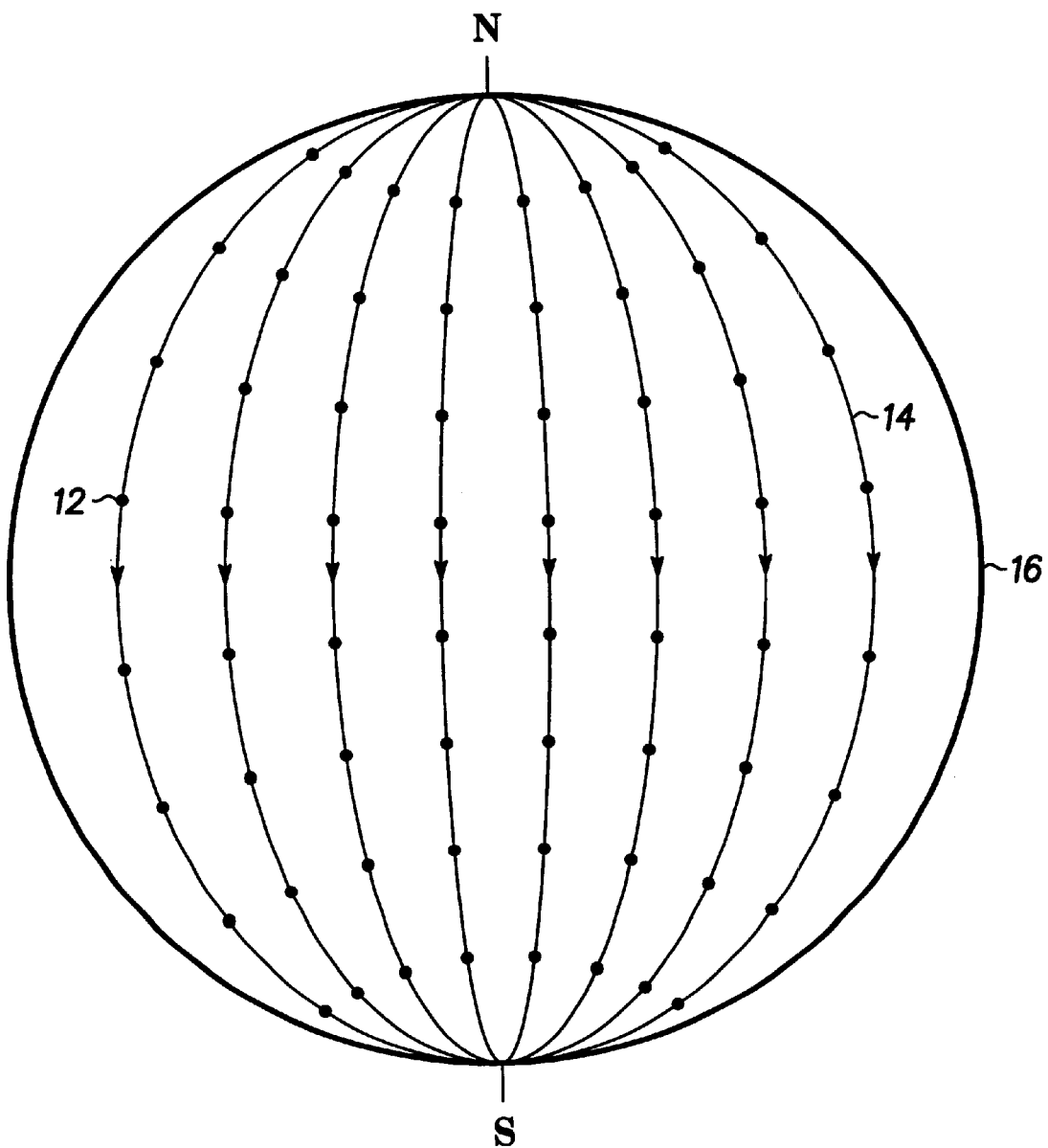
FIG. 1 is a diagram illustrating a satellite communications system that may utilize the present invention.

FIG. 1 illustrates a portion of a satellite communications system 10 which may be adapted in accordance with the present invention. As illustrated, the system 10 includes a constellation of satellites 12 (represented as dots in FIG. 1) arranged in a plurality of substantially polar orbital planes 14 surrounding the earth 16. The satellites 12 each revolve around the earth 16 on a trajectory defined by the corresponding orbital plane 14. Each orbital plane 14 is substantially fixed with respect to the other orbital planes 14 in the system 10 and includes an equal number of satellites 12 to the other orbital planes 14. Each of the satellites 12 in the system 10 is able to communicate with other satellites 12 in the system 10. In addition, each of the satellites 12 is capable of communicating with ground stations (not shown) on the surface of the earth 16 that are located within a ground coverage area of the satellite 12. If enough satellites 12 are used in the system 10, continuous communications coverage can be provided over the entire surface of the earth 16.

Figure 2:
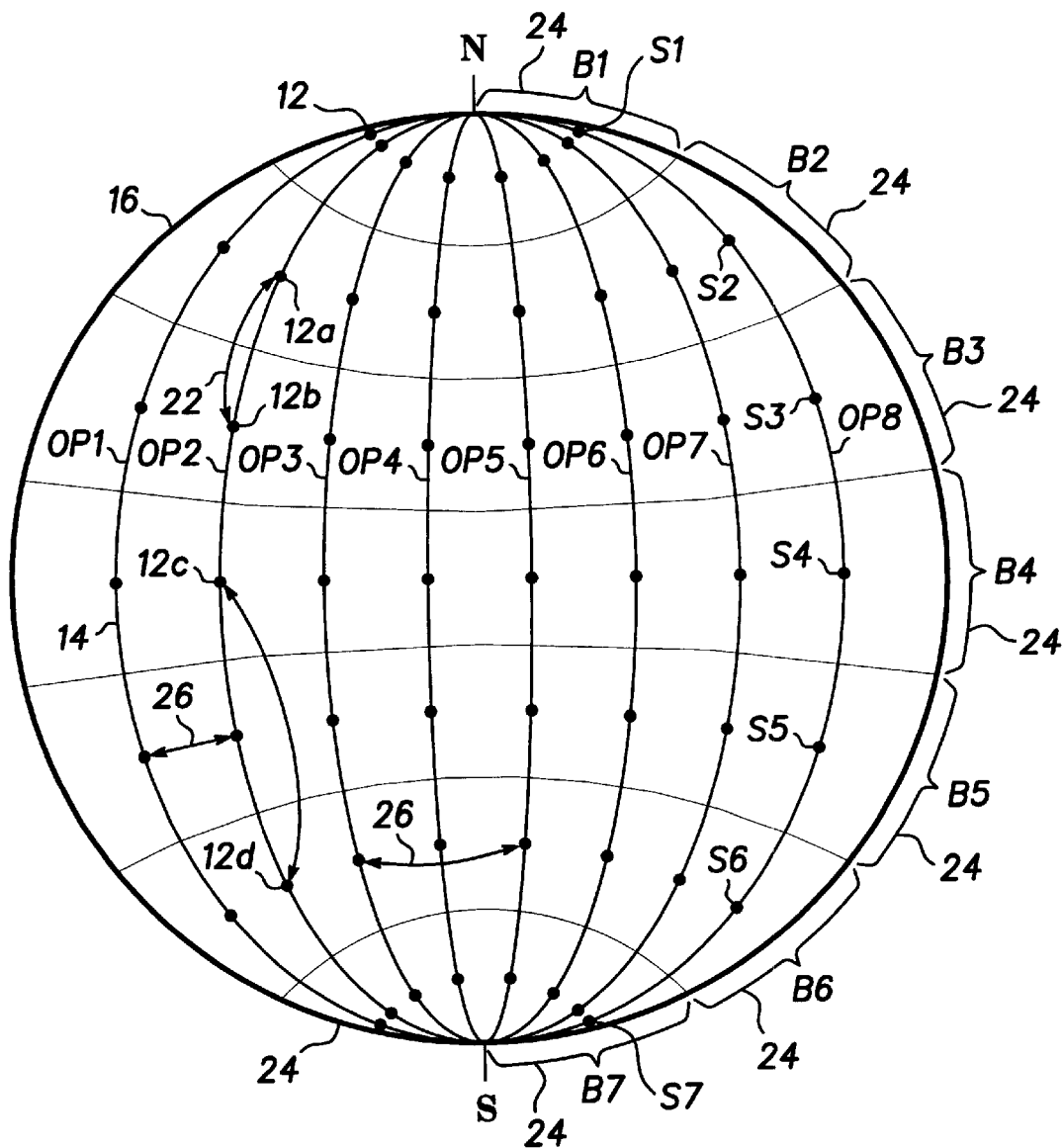
FIG. 2 is a diagram illustrating a satellite communications system in accordance with one embodiment of the present invention.

FIG. 2 illustrates a portion of a satellite communications system 20 in accordance with one embodiment of the present invention. The system 20 includes eight orbital planes 14, each carrying fourteen satellites 12. The fourteen satellites 12 are equally spaced around the periphery of each orbital plane 14 and, therefore, only seven satellites are shown in FIG. 2 for each orbital plane 14. In accordance with the invention, each of the orbital planes 14 in the system 20 is assigned a unique orbital plane identifier (i.e., OP1–OP8) that indicates where in the system 20 the particular orbital plane 14 is located relative to the other orbital planes. In addition, each satellite 12 within each orbital plane 14 is assigned a unique satellite identifier that indicates where the satellite 12 is located within the corresponding orbital plane 14, relative to the other satellites. For example, FIG. 2 illustrates the satellite identifiers (i.e., identifiers S1–S7) assigned to some of the satellites 12 in orbital plane OP8. Similar identifiers (i.e., identifiers S8–S14) are assigned to the other satellites 12 in orbital plane OP8 that are not shown in FIG. 2. Using the orbital plane identifiers and the satellite identifiers, any particular satellite 12 in the system 20 can be addressed for data transfer purposes. Each of the satellites 12 in the system 20 is aware of its position in the constellation with respect to the other satellites 12 (i.e., each knows its own address and the address of the surrounding satellites).

In the system 20 of FIG. 2, data traffic can occur in a substantially north/south direction along any one of the orbital planes 14. That is, north/south crosslinks (NSCs) 22 exist between adjacent satellites in each orbital plane 14 (such as, e.g., satellites 12a and 12b in orbital plane OP2) that provide a communication path between the adjacent satellites. NSCs 22 may also exist between nonadjacent satellites in an orbital plane 14 (such as, e.g., satellites 12c and 12d in orbital plane OP2). Delivery of information between non-adjacent satellites using an NSC 22 is known as a double hop. In addition to the above, a plurality of east/west crossconnects 24, referred to herein as bands 24, are defined for use in transferring information in an approximately east/west direction (i.e., approximately parallel to lines of latitude) between orbital planes 14. The bands 24 are therefore substantially orthogonal to the orbital planes 14. Each of the bands 24 includes a plurality of east/west crosslinks (EWCs) 26 that provide communication paths between satellites within the band 24. As with the NSCs 22, the EWCs 26 can link adjacent satellites or non-adjacent satellites in a common band 24. In addition, there may be multiple EWCs 26 between a given pair of satellites 12 in a common band 24 to accommodate different types of information traffic. In accordance with the invention, each of the bands 24 is assigned a band identifier (i.e., B1–B7) to distinguish it from the other bands in the system 20. The bands 24 are stationary with respect to the earth 16 and, therefore, the band 24 in which a particular satellite 12 falls is constantly changing. To keep track of these changes in band position, routing tables can be constantly updated for each satellite 12. The updates can be made at predetermined times when band transitions are scheduled to occur.

Because the paths through the system 20 have been clearly defined and denominated, and because the number of paths in the system has been accordingly limited, a single centralized controller can be used to control information routing throughout the entire system 20. The centralized controller may include, for example, a separate server for each of the users in the system. In one embodiment of the present invention, the centralized controller is ground based and communicates with the constellation via an uplink to one of the satellites in the network. Alternatively, the centralized controller may be located on, for example, an airplane, a ship, or one of the satellites in the constellation. In addition, a backup controller can be provided to take over the routing function should the primary controller malfunction during operation. If a backup controller is implemented, it is desirable that a constant exchange of information be maintained between the primary and the backup so that standby readiness is assured.

Figure 3:
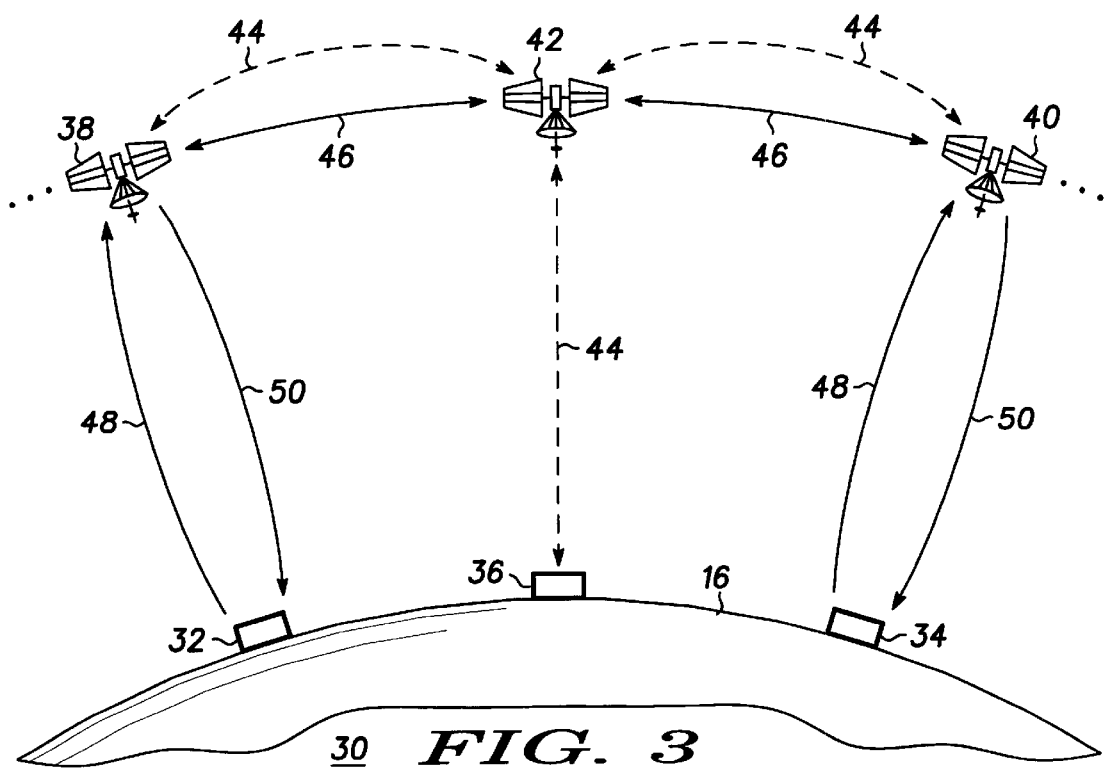
FIG. 3 is a diagram illustrating a portion of a satellite communications system implementing a centralized routing controller in accordance with one embodiment of the present invention.

FIG. 3 is a diagram illustrating a portion 30 of satellite communications system 20 including a ground based centralized controller 36. Although operation of the centralized controller 36 will be described with respect to only a portion 30 of the system 20, it should be appreciated that the centralized controller 36 will normally be operative for controlling the routing function in the entire system 20 in accordance with the present invention. As illustrated in FIG. 3, system portion 30 includes: a first ground station 32; a second ground station 34; a centralized controller 36; a plurality of satellites 38–42; a plurality of crosslinks 46 for transferring information packets between satellites; a plurality of uplinks 48 and downlinks 50 for transferring data packets between ground stations 32, 34 and corresponding satellites 38, 40; and a plurality of signalling channels 44 used by the centralized controller 36 to communicate with each of the satellites in the system. It should be appreciated that centralized controller 36 may be located within one of the ground stations of the system, or in any other locale spatially separated from the constellation of satellites.

In one embodiment of the present invention, the system portion 30 operates as follows. A user proximate to the first ground station 32 requests a communication channel with a user proximate to the second ground station 34. The first ground station 32 delivers information to source satellite 38 indicating that a connection is desired with ground station 34. Using the signalling channels 44, the centralized controller 36 monitors each of the satellites in the system to determine whether information needs to be delivered from one satellite to another satellite. When the controller 36 determines that satellite 38 requires a connection to satellite 40, the controller 36 assigns a route through the satellite network to establish the connection. The route chosen by the controller 36 is then maintained for the duration of the connection as long as the route is not interrupted by equipment malfunction.

As described above, the primary function of the centralized controller 36 is to assign a route through the satellite network for information packets associated with a given connection. The centralized controller 36 assigns routes based on current traffic levels in the system 20 so that traffic congestion in the system 20 can be significantly reduced. In addition, the centralized controller 36 may also take transport delay and quality of service (QOS) concerns into account in assigning a route to a given connection. For example, the centralized controller 36 will generally assign routes having a shorter path length over routes having a longer path length, if neither route will result in congestion.

Because the centralized controller 36 assigns the routes through the network for all of the required connections, it can keep track of traffic levels on the various communications crosslinks in the system 20 using the previously assigned information packet flow routes. For example, the controller 36 can include a memory having a storage location corresponding to each of the communications crosslinks in the system. Every time a route is assigned that utilizes a particular crosslink, the value in the corresponding memory location can be updated to indicate the increased traffic on the crosslink. Similarly, when a connection that uses a particular crosslink is terminated, the value in the corresponding memory location can be updated to indicate the decreased traffic on the crosslink.

Figure 4:
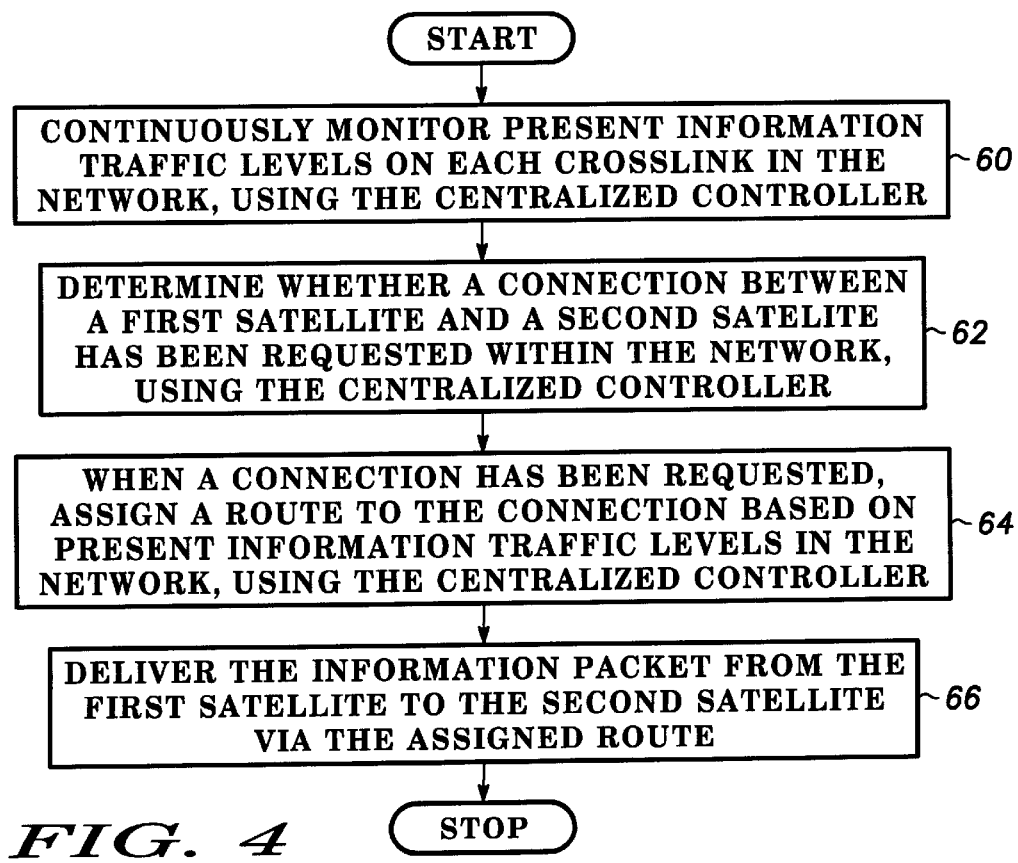
FIG. 4 is a flow chart illustrating an operating procedure in accordance with one embodiment of the present invention.

FIG. 4 is a flow chart illustrating an operating procedure in accordance with one embodiment of the present invention. The centralized controller 36 continuously monitors the present information traffic levels on the various crosslinks in the network (step 60). This can be accomplished, for example, by using a memory as described above. The centralized controller 36 also monitors the network to determine whether a connection between satellites has been requested anywhere within the system (step 62). The controller 36 may use signalling channels within the system, such as signalling channels 44, to perform this function. When the controller 36 determines that a connection between a first satellite and a second satellite has been requested, the controller 36 assigns a route through the network to the connection (step 64). To determine which route to assign, the controller 36 checks the present information traffic levels on all possible routes between the first satellite and the second satellite and assigns a route that avoids traffic congestion in the network. The information packet is then delivered from the first satellite to the second satellite over the assigned route (step 66).

In one embodiment of the present invention, the controller 36 only considers traffic levels on the bands 24 in the system 20 in assigning routes through the system. The controller 36 continuously monitors the traffic density along each of the bands 24 in the system 20. When a connection is desired between satellites in different orbital planes 14, the controller 36 checks the current traffic density on bands between the two orbital planes and assigns a band over which the information must flow. In this way, traffic can be more effectively distributed between the bands 24 of the system 20 and traffic congestion on any particular band 24 can be reduced or avoided. As stated above, the centralized controller 36 may also consider QOS in assigning a band for a given connection.

After the centralized controller 36 assigns a band 24 to a given connection, the controller 36 then causes circuitry within the source satellite 38 to append information to the packets to be delivered to the destination satellite 40 to create modified information packets. The information appended to the modified packets can include the band identifier of the assigned band, the orbital plane identifier of the orbital plane carrying the destination satellite, and the satellite identifier of the destination satellite. If the source satellite is located within the assigned band, the modified packets are immediately delivered to another satellite within the assigned band in the direction of shortest path length to the orbital plane of the destination satellite. (As used herein, the phrase "shortest path length" refers to the least number of hops to the desired location. The direction requiring the least number of hops can, for example, be determined using either an algorithm or a lookup table approach.) If the source satellite is not located within the assigned band, the modified packets are delivered to another satellite on the same orbital plane as the source satellite in the direction of shortest path length to the assigned band.

When an intermediate satellite 12 receives a packet from another satellite 12 in the system 20, it immediately reads the appended information. First, the intermediate satellite looks at the destination satellite information (i.e., orbital plane and satellite number) to determine whether it is the destination satellite. If the intermediate satellite is the destination satellite, it transfers the packet to a corresponding ground station for delivery to a user. If the intermediate satellite is not the destination satellite, but is in the same orbital plane as the destination satellite, the intermediate satellite transfers the packet to another satellite in the same orbital plane in the direction of shortest path length to the destination satellite.

If the intermediate satellite is not in the same orbital plane 14 as the destination satellite, the intermediate satellite checks the assigned band information in the packet to determine whether it is in the assigned band. If the intermediate satellite is in the assigned band, it delivers the packet to another satellite within the assigned band that is in the direction of shortest path length to the orbital plane of the destination satellite. If the intermediate satellite is not within the assigned band, the packet is delivered to another satellite within the same orbital plane as the intermediate satellite in a direction of shortest path length to the assigned band. Using the above procedure, packets may be efficiently and reliably delivered between a source satellite and a destination satellite in a satellite communications system.

Once a route has been assigned for a given connection, the assigned route is used for the duration of the connection. This assures that the delivered packets arrive at the destination satellite in sequence and within a desired transport delay range. Because both the satellite identifier and the orbital plane identifier of the destination satellite are specified in each packet, the system is able to reroute packets to the destination satellite should the assigned route become unavailable due to equipment failure. For example, if a node along the assigned band becomes disabled, the system can determine another route for the packet to take to the destination satellite. This feature results in fewer lost packets and generally increases the reliability of transfer.

It should be appreciated that the present invention is not limited to use in satellite communications systems but can be used in any packet-based communications system that is highly meshed, such as the Tymnet and Telenet systems. Further, the routing methods described and claimed herein find application in cell-based transmission schemes such as asynchronous transfer mode (ATM), as well as other transmission protocols such as internet protocol (IP).

What is claimed is:

1. In a satellite communications system having a constellation of satellites orbiting about a primary body, wherein said satellites represent nodes in a communications network, a method for use in routing an information packet from a source node to a destination node in said communications network, said method comprising the steps of:

providing a satellite communications network having a plurality of nodes and a plurality of paths connecting said plurality of nodes, said plurality of paths including a first group of paths having a first orientation and a second group of paths having a second, different orientation, wherein said first group of paths intersects said second group of paths at multiple node points;

providing an information packet at a source node, in said satellite communications network, said information packet to be delivered to a destination node in said satellite communications network, wherein said source node is on a first path in said first group of paths and said destination node is on a second, different path in said first group of paths;

monitoring traffic levels on said second group of paths from a centralized location in the satellite communications system;

choosing a third path from said second group of paths to carry said information packet from said first path to said second path based on traffic levels determined in said monitoring step; and delivering said information packet from said source node to said destination node via a route including said third path.

2. The method of claim 1, wherein:
said first group of paths is substantially orthogonal to said second group of paths.

3. The method of claim 1, wherein:
said first group of paths includes a group of substantially polar orbital planes.

4. The method of claim 3, wherein: said second group of paths includes a group of crossconnects substantially orthogonal to said group of substantially polar orbital planes, wherein each of said crossconnects comprises a band about said primary body that is stationary with respect to said primary body.

5. The method of claim 1, wherein:
said step of monitoring includes determining traffic information for said second group of paths in a centralized controller based on information flow routes previously assigned by said centralized controller.

6. The method of claim 1, wherein:
said step of delivering includes appending an identifier to said information packet identifying said third path.

7. The method of claim 1, wherein:
said step of delivering includes appending an identifier to said information packet identifying said destination node.

8. In a satellite communications system having a constellation of satellites arranged in a plurality of substantially polar orbital planes about the earth, wherein each of said plurality of substantially polar orbital planes are substantially fixed in relation to one another and each includes multiple satellites, a method for routing an information packet between a source satellite in a first orbital plane and a destination satellite in a second, different orbital plane, said method comprising the steps of:

defining a plurality of communications channels between predetermined orbital planes in said constellation;

choosing a first communications channel out of said plurality of communications channels to carry said information packet from said first orbital plane to said second orbital plane, based on information traffic levels in at least some of said plurality of communications channels, said first communications channel being chosen as a channel existing within a band having a traffic level that is relatively uncongested, said traffic level being determined based on monitoring said information traffic levels, wherein the band encircles the earth in an approximately east/west direction and is substantially stationary with respect to the earth; and delivering said information packet from said source satellite to said destination satellite via a route including said first communications channel;

wherein said step of defining a plurality of communication channels includes defining a plurality of communication channels for use in delivering information packets in an approximately east/west direction.

9. The method of claim 8, wherein:
said step of defining a plurality of communication channels includes defining a plurality of communication channels that are approximately parallel to lines of constant latitude.

10. The method of claim 8, wherein:
said information traffic levels are monitored from a centralized location within said satellite communications system.

11. The method of claim 8, wherein:
said step of defining a plurality of communications channels includes defining a plurality of bands, each band encircling the earth in a substantially east/west direction and including a plurality of satellites for effecting communication between said predetermined orbital planes.

12. The method of claim 8, wherein:
said information traffic levels are monitored by tracking previously assigned information flow routes.

13. In a satellite communications system having a constellation of satellites arranged in a plurality of substantially polar orbital planes about the earth, wherein each of said plurality of orbital planes are substantially fixed in relation to one another and each includes multiple satellites, a method for routing an information packet between a source satellite in a first orbital plane and a destination satellite in a second, different orbital plane, said method comprising the steps of:

defining a plurality of communications channels connecting orbital planes in said constellation;

choosing a first communications channel out of said plurality of communications channels for use in delivering said information packet from said first orbital plane to said second orbital plane;

appending a unique orbital plane identifier corresponding to said second orbital plane, a unique satellite identifier corresponding to said destination satellite, and a unique channel identifier corresponding to said first communications channel to said information packet to create a modified information packet; and using said identifiers in said modified information packet to deliver said modified information packet from said source satellite to said destination satellite, wherein said step of using includes using said unique channel identifier at an intermediate satellite between said source satellite and said destination satellite to determine whether said intermediate satellite is part of said first communications channel.

14. The method of claim 13, wherein:
said step of defining a plurality of communications channels includes defining a plurality of channels that are approximately parallel to lines of constant latitude.

15. The method of claim 13, wherein:
said step of choosing includes choosing based on information traffic levels in said constellation.

16. The method of claim 13, wherein said step of using includes:

determining whether said source satellite is part of said first communications channel;

when said source satellite is part of said first communications channel, transferring said information packet from said source satellite to another satellite within said first communications channel; and when said source satellite is not part of said first communications channel, transferring said information packet to another satellite within said first orbital plane.

17. The method of claim 16, wherein:

said step of transferring said information packet to another satellite within said first orbital plane includes transferring said information packet in a direction of shortest path length to said first communications channel.

18. The method of claim 13, wherein said step of using includes the steps of:

receiving said modified information packet at a first satellite; and determining whether said first satellite is said destination satellite using said unique orbital plane identifier and said unique satellite identifier from said modified information packet.

19. The method of Claim,13, wherein said step of using includes the steps of:

receiving said modified information packet at a first satellite;

determining whether said first satellite is within said second orbital plane using said unique orbital plane identifier from said modified information packet; and when said first satellite is determined to be within said second orbital plane:

determining whether said first satellite is said destination satellite using said unique satellite identifier from said modified information packet; and when said first satellite is determined not to be said destination satellite, transferring said modified information packet to another satellite in said second orbital plane.

20. The method of claim 19, wherein said step of using includes the step of:

when said first satellite is determined not to be within said second orbital plane:

determining whether said first satellite is part of said first communications channel using said unique channel identifier from said modified information packet;

when said first satellite is determined to be part of said first communications channel, transferring said modified information packet to another satellite within said first communications channel; and when said first satellite is determined not to be part of said first communications channel, transferring said modified information packet to another satellite within an orbital plane of said intermediate satellite.

21. In a centralized controller for use in a satellite communications system having a constellation of satellites orbiting about a primary body and a plurality of predetermined paths between satellites in said constellation, a method for use in controlling information packet flow between satellites in said constellation, said method comprising the steps of:

monitoring present information traffic levels on said plurality of predetermined paths based on information packet flow routes previously assigned by said centralized controller;

monitoring said constellation of satellites to determine whether a connection has been requested between a first satellite and a second satellite within said constellation; and when a connection has been requested, assigning a route to said connection, from said first satellite to said second satellite, based on said present information traffic levels determined in said step of monitoring present information traffic levels to reduce congestion on said predetermined paths in said satellite communications system.

22. The method of claim 21, wherein:

said step of assigning further comprises the step of assigning a route based on a desired quality of service.

23. A satellite communications system, comprising:

a fixed geometry constellation of satellites orbiting a primary body, wherein satellites in said constellation represent nodes in a communications network;

a plurality of predetermined communications paths between satellites in said constellation; and a centralized controller that monitors information traffic levels on at least two of said plurality of predetermined paths and determines information packet flow routes through said constellation of satellites based on said information traffic levels to reduce traffic congestion in said satellite communications system.

24. The system of claim 23, wherein:

said centralized controller is spatially separated from said constellation of satellites.

25. The system of claim 23, wherein:

said centralized controller is ground based.

26. The system of claim 23, further comprising:

a plurality of signalling channels for facilitating communication between said centralized controller and said satellites in said constellation of satellites.

27. The system of claim 23, wherein:

said centralized controller monitors said information traffic levels using previously assigned information packet flow routes.

28. The system of claim 23, wherein:

said fixed geometry constellation of satellites includes a plurality of polar orbital planes, each polar orbital plane including multiple satellites.

29. The system of claim 23, wherein:

said centralized controller includes memory means for storing present information traffic levels.

* * * * *